(12) United States Patent
Darde et al.

(10) Patent No.: US 9,851,142 B2
(45) Date of Patent: Dec. 26, 2017

(54) METHOD AND APPLIANCE FOR SEPARATING A MIXTURE CONTAINING CARBON DIOXIDE BY CRYOGENIC DISTILLATION

(71) Applicant: L'Air Liquide, Société Anonyme pour l'Etude et l'Exploitation des Procédés Georges Claude, Paris (FR)

(72) Inventors: Arthur Darde, Paris (FR); Mathieu Leclerc, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 14/431,219

(22) PCT Filed: Sep. 24, 2013

(86) PCT No.: PCT/FR2013/052237
§ 371 (c)(1),
(2) Date: Mar. 25, 2015

(87) PCT Pub. No.: WO2014/049259
PCT Pub. Date: Apr. 3, 2014

(65) Prior Publication Data
US 2016/0003530 A1  Jan. 7, 2016

(30) Foreign Application Priority Data

Sep. 25, 2012  (FR) ...................... 12 58999

(51) Int. Cl.
*F25J 3/02* (2006.01)
(52) U.S. Cl.
CPC ........... *F25J 3/0223* (2013.01); *F25J 3/0266* (2013.01); *F25J 2200/02* (2013.01);
(Continued)

(58) Field of Classification Search
CPC .. F25J 3/067; F25J 3/0266; F25J 3/066; F25J 2220/66
See application file for complete search history.

(56) References Cited

U.S. PATENT DOCUMENTS 3,349,571 A * 10/1967 Nebgen ................ B01D 5/0036
62/512
6,070,431 A    6/2000 Howard
(Continued)

FOREIGN PATENT DOCUMENTS

EP          1 953 486       8/2008

OTHER PUBLICATIONS

International Search Report and Written Opinion for PCT/FR2013/052237, dated Dec. 2, 2013.

*Primary Examiner* — Frantz Jules
*Assistant Examiner* — Brian King
(74) *Attorney, Agent, or Firm* — Elwood L. Haynes

(57) ABSTRACT

In a method for separating at least one lighter impurity of a gaseous mixture containing at least 30% mol of carbon dioxide, a liquid (101) enriched with carbon dioxide is drawn off into a vat of a distillation column (25), at least part (27) of the liquid enriched with carbon dioxide is vaporized and then heated to a first temperature higher than the boiling temperature thereof in the exchanger and leaves the exchanger at the hot end thereof, and at least part of the vaporized and heated liquid is sent from the hot end of the exchanger at the first temperature, without being cooled in the exchanger and without having been compressed, to the lower part of the distillation column, where it participates in the distillation while enriching itself.

5 Claims, 2 Drawing Sheets

(52) U.S. Cl.
CPC ........ *F25J 2200/40* (2013.01); *F25J 2200/70* (2013.01); *F25J 2205/04* (2013.01); *F25J 2210/04* (2013.01); *F25J 2210/70* (2013.01); *F25J 2220/82* (2013.01); *F25J 2230/30* (2013.01); *F25J 2235/02* (2013.01); *F25J 2235/80* (2013.01); *F25J 2240/90* (2013.01); *F25J 2245/02* (2013.01); *F25J 2270/02* (2013.01); *F25J 2270/80* (2013.01); *Y02C 10/12* (2013.01)

(56) References Cited

U.S. PATENT DOCUMENTS

| | | | |
|---|---|---|---|
| 8,590,340 B2 * | 11/2013 | Pitman | F25J 3/0209 62/620 |
| 2005/0092594 A1 * | 5/2005 | Parro | B01D 53/229 203/72 |
| 2011/0296867 A1 * | 12/2011 | Cuellar | F25J 3/0266 62/617 |

* cited by examiner

METHOD AND APPLIANCE FOR SEPARATING A MIXTURE CONTAINING CARBON DIOXIDE BY CRYOGENIC DISTILLATION

CROSS REFERENCE TO RELATED APPLICATIONS

This application is a 371 of International PCT Application No. PCT/FR2013/052237 filed Sep. 24, 2013 which claims priority to French Patent Application No. 1258999 filed Sep. 25, 2012, the entire contents of which are incorporated herein by reference.

BACKGROUND

The present invention relates to a method and an apparatus for separating a mixture containing carbon dioxide by cryogenic distillation.

For a variant, it relates to the scrubbing of a liquid mixture of $CO_2$ and impurities dissolved by cryogenic distillation, the tank liquid of the distillation column being reboiled and superheated.

The scrubbing of liquid $CO_2$ containing more volatile dissolved impurities is mostly done by cryogenic distillation. For this, the distillation column is fed with liquid $CO_2$ and a part of the liquid in the column tank is vaporized to generate the vapor which will run counter-current to the liquid all along the column. To generate the vapor, a reboiler is most often used: a hot fluid will reheat the liquid to its boiling point to generate the vapor at a temperature as close as possible to its liquid/vapor balance point to improve the distillation in the bottom of the column.

The nature of the hot fluid can vary: a utility (liquid water or steam, electricity, etc.), a fluid from the process, etc. In effect, the heat exchange in the reboiler makes it possible to cool the hot fluid. The exchanged cold can therefore be exploited.

In the case of separation of $CO_2$ by cryogenics (partial condensation, solidification, permeation, etc.), the gas to be scrubbed has to be cooled to enrich the production in $CO_2$. This gas can therefore be cooled against the liquid from the column tank to be distilled in the reboiler. Since the gas often has to be cooled to temperatures lower than the column tank, it will continue to be cooled in another exchanger against another cold fluid, as can be seen in EP-A-1953486.

US-A-2011/029867 illustrates only in the figures a duct making it possible to send tank liquid from the carbon dioxide distillation column to a heat exchanger where the mixture to be separated is cooled. A duct also makes it possible to return a fluid to the column but the document does not specify the state of this fluid.

The percentages relative to the purity in this text are molar percentages.

SUMMARY

According to one subject of the invention, there is provided a method for separating at least one lighter impurity of a gaseous mixture containing at least 30% mol of carbon dioxide in which:

i) the gaseous mixture is cooled in a heat exchanger, going into the heat exchanger at the hot end thereof, and then separated by means comprising a distillation column, the gaseous mixture or a fluid derived from the gaseous mixture, this fluid containing at least 60% carbon dioxide, being sent to the distillation column, ii) a liquid enriched in carbon dioxide is drawn off into a tank of the column, iii) a gas depleted in carbon dioxide and enriched in at least one lighter impurity is drawn off at the head of the column and reheated in the heat exchanger, iv) at least a part of the liquid enriched in carbon dioxide is sent into the exchanger, characterized in that the at least one part of the liquid sent to the exchanger is vaporized and then heated to a first temperature higher than its boiling point in the exchanger and leaves from the exchanger at the hot end thereof, and at least a part of the vaporized and heated liquid is sent from the hot end of the exchanger at the first temperature, without being cooled in the exchanger and without being compressed, to the bottom part of the distillation column, where it participates in the distillation by being enriched in at least one light impurity.

The gaseous mixture can contain at least 40%, at least 45% or at least 60% of carbon dioxide.

The first temperature can be at least 5° C. higher than the boiling point.

The first temperature can be higher than 0° C. or higher than 10° C.

The gaseous mixture can go into the heat exchanger at the hot end thereof at a temperature between 2 and 10° C. higher than the first temperature.

The tank liquid vaporized in the exchanger can be divided into two, one part being returned to the column at the first temperature and the other part constituting at least a part of a final product. This simplifies the structure of the exchanger since one passage serves to convey a single fluid which will have two different purposes.

1. According to another subject of the invention, there is provided an apparatus for separating at least one lighter impurity of a gaseous mixture containing at least 30% mol of carbon dioxide comprising at heat exchanger having a first end and a second end, separation means comprising at least one distillation column, a first duct for sending the gaseous mixture to be cooled in the heat exchanger linked to the first end of the heat exchanger to allow the gaseous mixture to enter, a second duct for sending the cooled gaseous mixture from the heat exchanger from the second end to the separation means, a third duct for sending the gaseous mixture or a fluid derived from the gaseous mixture to the distillation column or one of the distillation columns, a fourth duct for drawing off a carbon dioxide-enriched liquid into a tank of the column linked to the heat exchanger to allow the reheating of at least a part of the drawn off liquid, a fifth duct for drawing off a gas depleted in carbon dioxide and enriched in at least one lighter impurity at the column head linked to the heat exchanger to allow the reheating of the depleted gas and a sixth duct linked to the heat exchanger to bring a vapor resulting from the vaporization of the hot end of the heat exchanger to the bottom part of the column to be separated therein, without passing through the heat exchanger or through a compression means, characterized in that the sixth duct is linked to a first point of the first end.

The apparatus can comprise a seventh duct linked to the first point of the first end of the exchanger to extract vapor resulting from the vaporization of the apparatus as final product. Using one and the same exchanger paths to extract product at the column pressure and perform the reboiling makes it possible to not add or modify equipment for the reboiling since the vaporization of the product is exploited to extract the reboiling current.

Preferably, the apparatus does not comprise a heat exchanger in the tank of the column.

Preferably, the apparatus does not comprise means for reducing the pressure of the vapor in the sixth duct between the first point of the exchanger and the column.

Preferably, the apparatus does not comprise means for compressing the vapor resulting from the vaporization. The vapor is produced at the pressure of the tank of the column.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
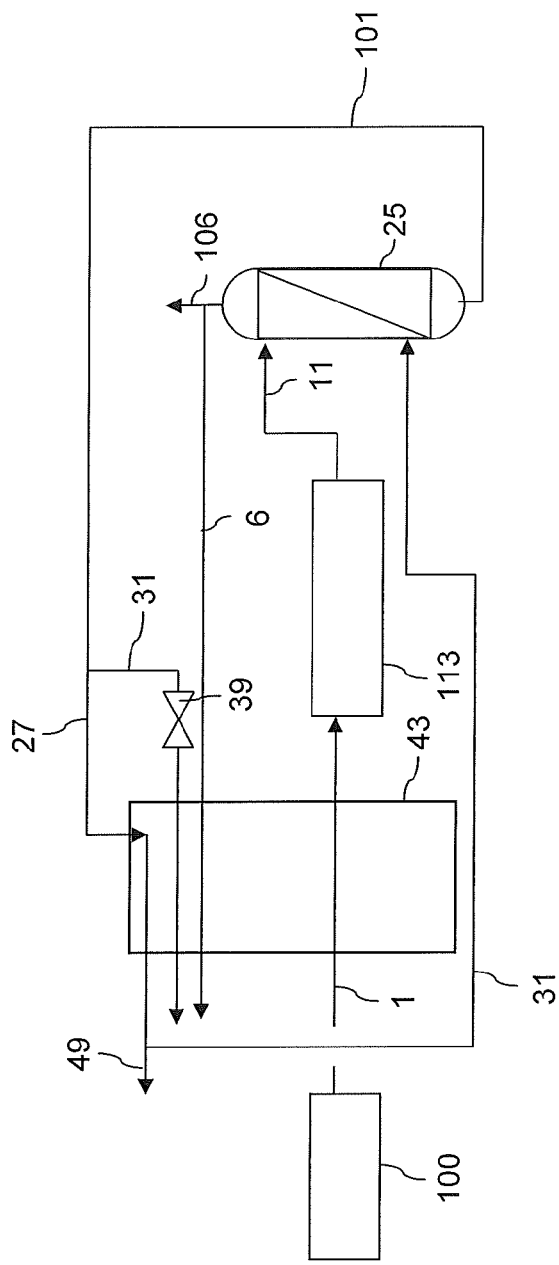
FIG. 1 illustrates one embodiment of the present invention.

According to the invention, in FIG. 1, a gaseous mixture 1 containing at least 30%, even at least 40% of carbon dioxide and at least one light impurity, that can be oxygen, carbon monoxide, nitrogen, argon, hydrogen, methane or at least two of these components, is separated to form a fluid richer in carbon dioxide. The gaseous mixture originates from a source 100 that can be an oxycombustion unit followed by scrubbing units for removing the water and other contaminants, such as dust, $SO_x$, $NO_x$. The gaseous mixture is compressed as required, for example to a pressure above 6 bar abs. The pressurized gaseous mixture 1 is cooled in a heat exchanger 43 with brazed aluminum plates or with tubes. The cooled gaseous mixture is, if necessary, treated in a treatment means, for example a separation means 113. This separation means 113 can constitute a phase separator or several phase separators in series to increase the carbon dioxide content of the gaseous mixture upstream of the column 25, for example to reach at least 80% of carbon dioxide for the liquid from a phase separator. The separation means 113 can alternatively or additionally comprise adsorbant beds and/or a distillation column, for example a column to eliminate NOx gases.

The liquid 11 enriched in carbon dioxide is sent to the head of the separation column at low temperature 10. The head gas is drawn off at the head of the column and is enriched in light components relative to the liquid 11. A part 106 of the gas is discharged to the atmosphere and the rest 6 is reheated in the exchanger 43.

The tank liquid 101 contains more than 90% of carbon dioxide and is separated into two parts. One part 31 is expanded in a valve 39 and is vaporized in the heat exchanger to form a gaseous product rich in carbon dioxide. The rest 27 is sent to an intermediate level of the heat exchanger 43, is vaporized therein and is heated up to the hot end of the exchanger to a first temperature. The vaporized throughput leaves the exchanger at the hot end at the first temperature and is then divided into two, one part 23 serving as product and the rest 31 being returned to the column 25. The gas 31 is neither compressed nor expanded between the hot end and the column 25. The gas 31 at the first temperature is returned to the bottom part of the column 25, without having been reheated or cooled, in or outside of the exchanger 43, and rises in the column 25 by being enriched in light impurities.

All the frigories for the separation, apart from those generated by Joule Thomson expansion, are produced by vaporization of the throughputs 27, 31. Thus, the input for the throughput 27 serves to vaporize the liquid to produce frigories for the process and to produce the reboiling gas.

If a part or all of the cold of the cold box is generated by the vaporization of the liquid obtained from the column at a pressure level corresponding to that of the column, it will therefore be possible to exploit the same intermediate input.

The drawing off of the gas 31, 49 at the hot end of the exchanger makes it possible to simplify the main exchanger. No intermediate output is required. The cost of the exchanger, and of the connections around the exchanger are therefore reduced in this way. The gas going into the column 25 will no longer be at the boiling point or at the dew point but very greatly superheated.

The table below gives compositions for FIG. 1.

|  | Feed throughput 1 | Throughput 11 | Throughput 101 | Throughput 31 |
|---|---|---|---|---|
| Compositions (% mol) | | | | |
| $CO_2$ | 79.4 | 99 | >99.99 | >99.99 |
| $O_2$ | 7.6 | 0.4 | 1 ppmv | 1 ppmv |
| $N_2$ | 8.5 | 0.2 | <1 ppmv | <1 ppmv |
| Ar | 4.5 | 0.4 | <1 ppmv | <1 ppmv |
| Pressure (bara) | 21 | 11 | 11 | 11 |
| Temperature (° C.) | 35 | −47.3 | −37.6 | +32 |
| Throughput (kg/h) | 212 066 | 151 123 | 156 721 | 9 925 |

Since the steam 31 is not at equilibrium, a part of the liquid/gas contact in the bottom of the column will not be the subject of distillation but of heat transfer with regard to this case. Since the purity of the gas 6 is inconsequential, the deterioration of the distillation which results therefrom is not damaging.

Thus, this column 25 is like a stripping column. However, this effect is highly attenuated because the quantity of vapor needed is lower when the gas is hotter (to achieve the same liquid $CO_2$ purity). There is no impact on the overall energy consumption. Thus, the price of the apparatus is reduced without increasing the operating costs.

For this scheme, the absence of any carbon dioxide compressor will be noted.

Figure 2:
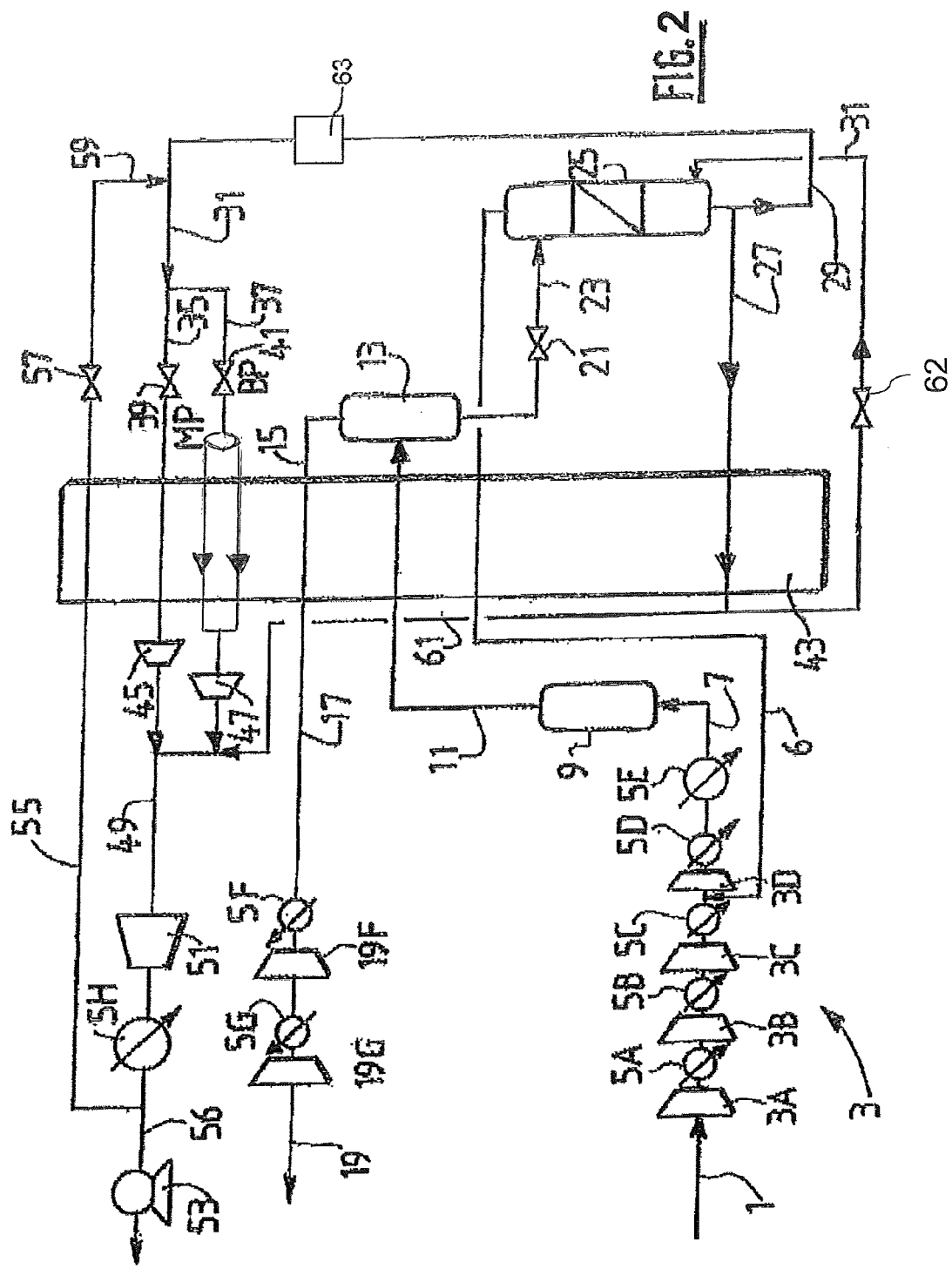
FIG. 2 illustrates another embodiment of the present invention.

In FIG. 2, a wet gas 1 containing carbon dioxide and oxygen or carbon monoxide is compressed in a compressor 3. This compressor 3 comprises four stages 3A, 3B, 3C, 3D, each being followed by a cooling means 5A, 5B, 5C, 5D. After cooling in the cooling means 5D, the gas 1 is cooled by the cooler 5E to form the gas 7 and sent into a scrubbing unit 9 to remove the moisture. The dry gas formed 11 is cooled in a first exchanger 43 where it is cooled and is partially condensed. The partially condensed gas is sent to a phase separator 13. The liquid from the phase separator 13 is sent to a valve 21 to form the liquid 23 and gas generated by the expansion which feed the distillation column 25 at the head.

A gas enriched in oxygen and/or nitrogen 6 is drawn off from the head of the column and sent upstream of the cooler 5D. Alternatively, it can be returned to the oxycombustion unit from which the gas 1 originates.

A part 27 of the tank liquid of the column 25, rich in carbon dioxide, is sent to the first exchanger 43. This part of the tank liquid 27 is vaporized and is reheated by passing entirely through the first exchanger 43 and is divided into two. One part 61 is sent downstream of the compressor 47 and the rest 31 is sent through a control valve 62 into the tank of the column 25.

It is also possible to treat the tank liquid 27 in a second distillation column to produce a second tank liquid which is then vaporized in the exchanger 43.

The rest of the tank liquid 29 is not heated in the exchanger but is sub-cooled in the sub-cooler 63 then mixed with a cycle fluid 51. The sub-cooling can also be done in the exchanger 43. The mixture formed 31 is divided into three parts. The part 37 is expanded by the valve 41 at low pressure and sent to a phase separator. The gas from the phase separator is reheated in the first exchanger and the liquid from the phase separator is vaporized in the first exchanger 43 and then the gas and the vaporized liquid are compressed in a compressor 47. The part 35 is expanded by the valve 39 at a medium pressure, vaporized in the first exchanger 43 and then compressed by a compressor 45. The mixture 49 thus formed by mixing the gas 61 and the compressed gases in the compressors 45, 47 is compressed in a compressor 51, condensed then divided into two. One part 56 is pressurized by a pump 53 to form a liquid product. The rest 55 is cooled in the first exchanger 43, is expanded in the valve 57 and mixed with the throughput 29 to be returned to the first exchanger 43, in refrigeration cycle.

The gas 15 from the phase separator 13 is reheated in the first exchanger 43 to form a throughput 17 which is reheated by the reheaters 5F, 5G and expanded by two turbines 19F, 19G in series to form the expanded throughput 19.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for separating at least one lighter impurity of a gaseous mixture containing at least 30% mol of carbon dioxide comprising:
    i) cooling the gaseous mixture in a heat exchanger, the heat exchanger comprising a hot end, the gaseous mixture entering the heat exchanger at the hot end, and the cooled gaseous mixture or a fluid derived from the gaseous mixture, this fluid containing at least 60% carbon dioxide, being separated by a distillation column, the distillation column having a head and a bottom part,
    ii) removing a liquid enriched in carbon dioxide from the distillation column,
    iii) drawing off a gas depleted in carbon dioxide and enriched in at least one lighter impurity at the head of the column and reheating this drawn off gas in the heat exchanger,
sending at least a part of the liquid enriched in carbon dioxide to the heat exchanger wherein at least one part of the liquid sent to the heat exchanger is vaporized and then super-heated to a first temperature in the heat exchanger and leaves from the heat exchanger at the hot end thereof, and at least a part of the vaporized and heated liquid is sent from the hot end of the heat exchanger at the first temperature, without being cooled in the heat exchanger and without having been compressed, to the bottom part of the distillation column, thereby becoming enriched in at least one lighter impurity, wherein the at least part of the liquid enriched in carbon dioxide that has been vaporized and super-heated is divided into two parts, one part being returned to the column at the first temperature and the other part constituting at least a part of a final product.

2. The method of claim 1, wherein the first temperature is at least 5° C. higher than the boiling point.

3. The method of claim 1, wherein first temperature is higher than 0° C.

4. The method of claim 3, wherein the first temperature is higher than 10° C.

5. The method of claim 1, wherein the gaseous mixture goes into the heat exchanger at the hot end thereof at a temperature between 2 and 10° C. higher than the first temperature.

* * * * *